(12) United States Patent
Suzuki et al.

(10) Patent No.: US 6,236,430 B1
(45) Date of Patent: *May 22, 2001

(54) COLOR STILL IMAGE SENSING APPARATUS AND METHOD

(75) Inventors: Fuminori Suzuki, Sayama; Satoshi Watanabe, Yamato; Hiroshi Kitagawa, Sagamihara, all of (JP)

(73) Assignee: Techno Media Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,828
(22) PCT Filed: Nov. 7, 1996
(86) PCT No.: PCT/JP96/03260
   § 371 Date: Jul. 9, 1997
   § 102(e) Date: Jul. 9, 1997
(87) PCT Pub. No.: WO97/17811
   PCT Pub. Date: May 15, 1997

(30) Foreign Application Priority Data

Nov. 10, 1995  (JP) ................................................ 7-317397

(51) Int. Cl.[7] .............................. H04N 5/225; H04N 9/04
(52) U.S. Cl. ............................................ 348/219; 348/273
(58) Field of Search .................................... 348/218, 219, 348/272, 273, 274

(56) References Cited

U.S. PATENT DOCUMENTS

| | | | |
|---|---|---|---|
| 4,998,164 | * 3/1991 | Endo et al. ........................... | 348/219 |
| 5,245,416 | * 9/1993 | Glenn .................................... | 348/219 |
| 5,315,411 | * 5/1994 | Blanding .............................. | 348/219 |
| 5,373,322 | * 12/1994 | Laroche et al. ...................... | 348/273 |
| 5,382,976 | * 1/1995 | Hibbard ............................... | 348/273 |
| 5,402,171 | * 3/1995 | Tagami et al. ....................... | 348/219 |
| 5,834,761 | * 11/1998 | Okada et al. ..................... | 250/208.1 |
| 6,133,953 | * 10/2000 | Okada ................................. | 348/272 |

* cited by examiner

*Primary Examiner*—Wendy R. Garber
*Assistant Examiner*—Jacqueline Wilson
(74) *Attorney, Agent, or Firm*—Townsend and Townsend and Crew LLP (57) ABSTRACT

This invention provides a color still image sensing apparatus and method, which can obtain image quality as high as that of the three-plate type with cost as low as the single-plate type, and can prevent the input time from becoming redundant. A solid-state image sensing device, which has an image sensing surface made up of a large number of photoelectric conversion elements arranged in a matrix and to the front surface of the image sensing surface of which a color filter having different color component regions in correspondence with the arrangement intervals of photoelectric conversion elements is fixed, is used, the irradiation region of incident light with respect to the solid-state image sensing device is changed in units of arrangement intervals of the photoelectric conversion elements by displacing the solid-state image sensing device and the incident light with respect to the solid-state image sensing device relative to each other along the image sensing surface in units of arrangement intervals of the photoelectric conversion elements, and image data of the solid-state image sensing device sensed at a plurality of changed positions are synthesized to an image.

11 Claims, 7 Drawing Sheets

COLOR STILL IMAGE SENSING APPARATUS AND METHOD

BACKGROUND OF THE INVENTION

The present invention relates to a color still image sensing apparatus and method using a solid-state image sensing device.

Conventionally, the following color image sensing apparatus systems using solid-state image sensing devices such as a CCD (Charge Coupled Device), and the like are available.

(1) Three-plate Type Color Camera

Incident light is separated into three primary colors with an optical system (prism), and the separated three components of colors are respectively received with three solid-state image sensing devices. With the three-plate type color camera, since the three color components can be extracted at the same time, and an independent processing system is used for each color component, ideal image sensing characteristics can be obtained.

However, with this type of color camera, three solid-state image sensing devices are required, the color-separation optical system is complex, and the three solid-state image sensing devices require high attachment precision, resulting in an expensive system.

(2) Single-plate Type Color Camera

In a camera of this type, color filters are attached to the individual pixels (photoelectric conversion elements) of a solid-state image sensing device to obtain color information from a single solid-state image sensing device. The color filters normally used have a mosaic or stripe pattern in which primary colors or complementary colors are arranged in correspondence with the individual pixels. In this single-plate type color camera, no special color-separation optical system is required unlike in the three-plate type, and only one solid-state image sensing device is required, resulting in an inexpensive system.

However, since information extracted from one pixel pertains to a single color, and insufficient color information is compensated for using information of the neighboring pixels, such compensation may cause production of false colors (moiré) or a low resolution.

(3) Color Filter Switching Single-plate Type Color Camera

In this camera, a single solid-state image sensing device is used, and color filters inserted in the optical path from the object to the solid-state image sensing device are switched in turn in synchronism with the charge transfer timings of the solid-state image sensing device, thereby extracting color information. A color still image is obtained by accumulating and synthesizing the extracted color information. In this case, a technique of improving the resolution by a pixel shift method is available (Japanese Patent Laid-Open No. 6-181546).

In this color filter switching type, image quality as high as that of the three-plate type can be obtained by a single plate. However, since relatively large color filters are, for example, rotated to sequentially convert the colors of light entering the solid-state image sensing device, image sensing input requires a long time, and the apparatus becomes bulky.

SUMMARY OF THE INVENTION

The present invention has been made in consideration of the above situation, and has as its object to provide a color still image sensing apparatus and method, which can obtain image quality as high as a three-plate type with cost as low as a single-plate type, and can prevent the input time from becoming redundant.

In order to achieve the above object, a color still image sensing apparatus according to the present invention is characterized by a solid-state image sensing device having an image sensing surface made up of a large number of photoelectric conversion elements arranged in a matrix, a color filter fixed to a front surface of the image sensing surface of the solid-state image sensing device and having different color component regions in correspondence with arrangement intervals of the photoelectric conversion elements, driving means for displacing the solid-state image sensing device and incident light with respect to the solid-state image sensing device relative to each other along the image sensing surface in units of arrangement intervals of the photoelectric conversion elements so as to change an irradiation position of the incident light with respect to the solid-state image sensing device, storage means for recording image data of the solid-state image sensing device sensed at a plurality of positions corresponding to the irradiation positions changed by the driving means, and processing means for reading out the image data stored in the storage means and synthesizing the readout image data into an image.

Preferably, the driving means is adapted to displace the solid-state image sensing device and the incident light a plurality of number of times, so that an irradiation region of the incident light having a size corresponding to a size of the photoelectric conversion element moves to all types of adjacent color component regions of the color filter of the solid-state image sensing device.

In order to further improve the resolution, the driving means is adapted to displace the solid-state image sensing device and the incident light relative to each other by ½ of the arrangement interval of the photoelectric conversion element, and displaces the solid-state image sensing device and the incident light relative to each other therefrom in units of arrangement intervals of the photoelectric conversion elements so as to change the irradiation position of the incident light with respect to the solid-state image sensing device.

As a preferred arrangement, the driving means has a support device for supporting the fixed image sensing device to be movable in a first direction and a second direction which makes a right angle with the first direction, and the support device has first and second plate members each of which has a support plate portion which defines a surface perpendicular to an optical axis of the incident light, upright portions formed at right angles on both sides of the support plate portion, and attachment plate portions formed at end portions of the upright portions on both sides, and extending parallel to the support plate portion, and is integrally formed by bending a thin plate having elasticity. Rigidity in bending of the first and second plate members is preferably reduced at bent portions.

Also, in order to achieve the above object, a color still image sensing method according to the present invention is characterized by using a solid-state image sensing device which has an image sensing surface made up of a large number of photoelectric conversion elements arranged in a matrix, and to a front surface of the image sensing surface of which a color filter having different color component regions in correspondence with arrangement intervals of the photoelectric conversion elements is fixed, and changing an irradiation position of incident light with respect to the solid-state image sensing device by displacing the solid-state image sensing device and the incident light with respect to the solid-state image sensing device relative to each other along the image sensing surface in units of arrangement intervals of the photoelectric conversion elements, and synthesizing image data of the solid-state image sensing device sensed at a plurality of changed positions into an image.

DESCRIPTION OF THE PREFERRED EMBODIMENTS

An embodiment of the present invention will be described in detail hereinafter with reference to the accompanying drawings.

Figure 4:
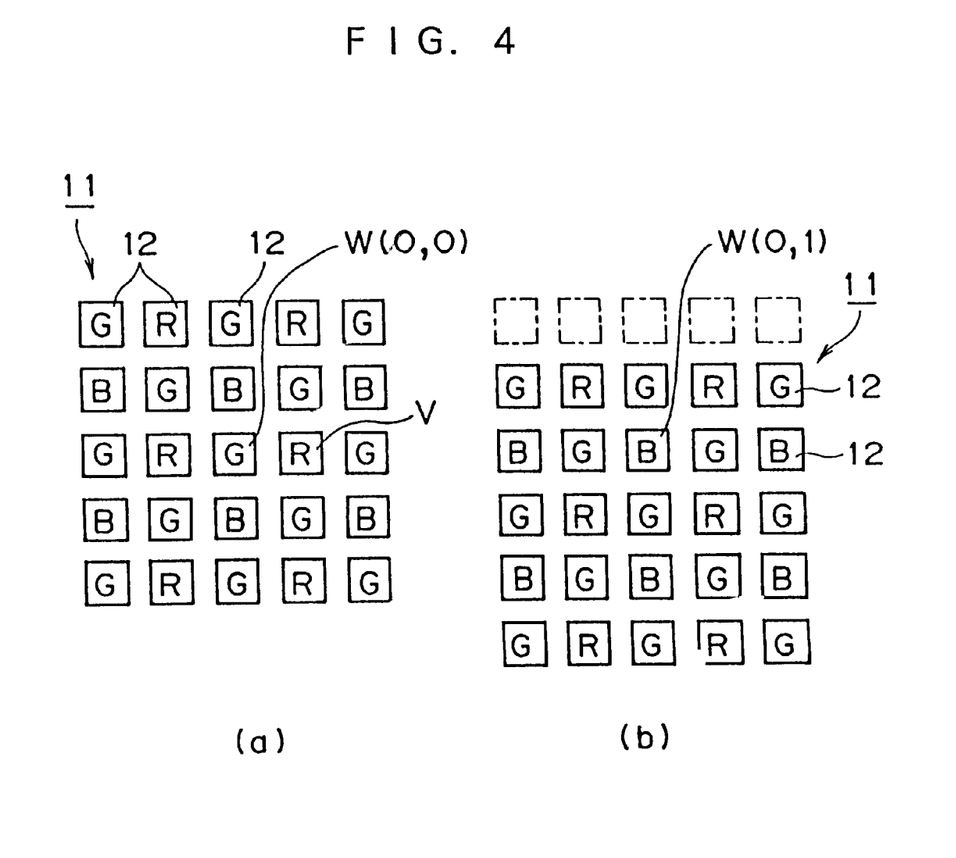
FIG. 4 is an explanatory view of the principle of the present invention.

FIG. 4 is an explanatory view of the principle of the present invention. FIG. 4 partially shows a color filter 11, and a large number of squares illustrated in the figure respectively represent color component regions 12 of the color filter 11. In these color component regions 12, three primary colors, i.e. R, G, and B filters, are set in a mosaic pattern. The color arrangement of the filters in this technique is a so-called Bayer arrangement in which rows including alternating G and R components and rows including alternating B and G components are alternately arranged so that G components form a checkerboard pattern. In this connection, it is generally known that the resolution can be improved by increasing the number of G signals.

A solid-state image sensing device (not shown in FIG. 4) is located behind the color filter 11. The solid-state image sensing device comprises, e.g. a CCD, and has an image sensing surface made up of a large number of photodiodes as photoelectric conversion elements that serve as pixels arranged in a matrix (e.g., 250 thousand photodiodes at arrangement intervals of 7 μm). The color filter 11 is fixed to the front surface of the image sensing surface. The individual color component regions 12 of the color filter 11 are arranged to oppose the photoelectric conversion elements of the fixed image sensing device to have a one-to-one correspondence therebetween, and each photoelectric conversion element receives incident light that has been transmitted through the filter in the opposing color component region. The color filter 11 and the solid-state image sensing device are aligned and attached to the focal point position of a lens system (not shown) of a camera.

In such a solid-state image sensing device, since the colors of the filters attached to the individual photoelectric conversion elements are fixed, only one color information per image sensing can be extracted from a single photoelectric conversion device.

Incident light coming from the lens system of the camera is irradiated onto the entire image sensing surface of the solid-state image sensing device. For example, a certain point W on the image sensing surface irradiated with the incident light will be examined below. Assume that the coordinate position of the point W on the solid-state image sensing device in FIG. 4(a) is defined as (0, 0). When the solid-state image sensing device is shifted downward from the state shown in FIG. 4(a) accurately by one pixel (corresponding to the arrangement interval of the photoelectric conversion elements) on an X-Y coordinate system in the image sensing surface, the point W moves to a coordinate position (0, 1) on the solid-state image sensing device, as shown in FIG. 4(b).

That is, the filter color at the coordinate position (0, 0) on the solid-state image sensing device is G, but the filter color at the coordinate position (0, 1) is B. For this reason, when image sensing is done respectively at the two coordinate positions (0, 0) and (0, 1), information of two color components (G, B) can be extracted in correspondence with the point W.

Likewise, when the solid-state image sensing device is shifted to the left to move the point W to a coordinate position (1, 0), the filter color at that position is R, and if image sensing is done at that position, R information can be obtained. After all, all the required three color components (R, G, B) at the point W can be extracted by executing image sensing at the coordinate positions (0, 0), (0, 1), and (1, 0).

On the other hand, in this color filter 11, in order to obtain three color components at, for example, a point V in FIG. 4(a), image sensing must be done at coordinate positions (0, 0), (0, 1), and (1, 1) in relation of the color arrangement.

Hence, in this example of the color filter 11, when image sensing is done respectively at the coordinate positions (0, 0), (0, 1), (1, 0), and (1, 1), all the color components for all the pixels can be obtained by a total of four image sensing operations.

Note that the above-mentioned color filter arrangement of the solid-state image sensing device is merely an example for descriptive purposes, and all the color components for all the pixels can be obtained by appropriately selecting the moving directions, distances, order, the number of times, and the like of the solid-state image sensing device in correspondence with the color arrangement of the color filter.

In this manner, when the solid-state image sensing device having the color filter is moved relative to incident light and image data sensed at a plurality of positions are synthesized, a color still image with a high resolution can be obtained even by a relatively small number of pixels of the solid-state image sensing device.

Figure 1:
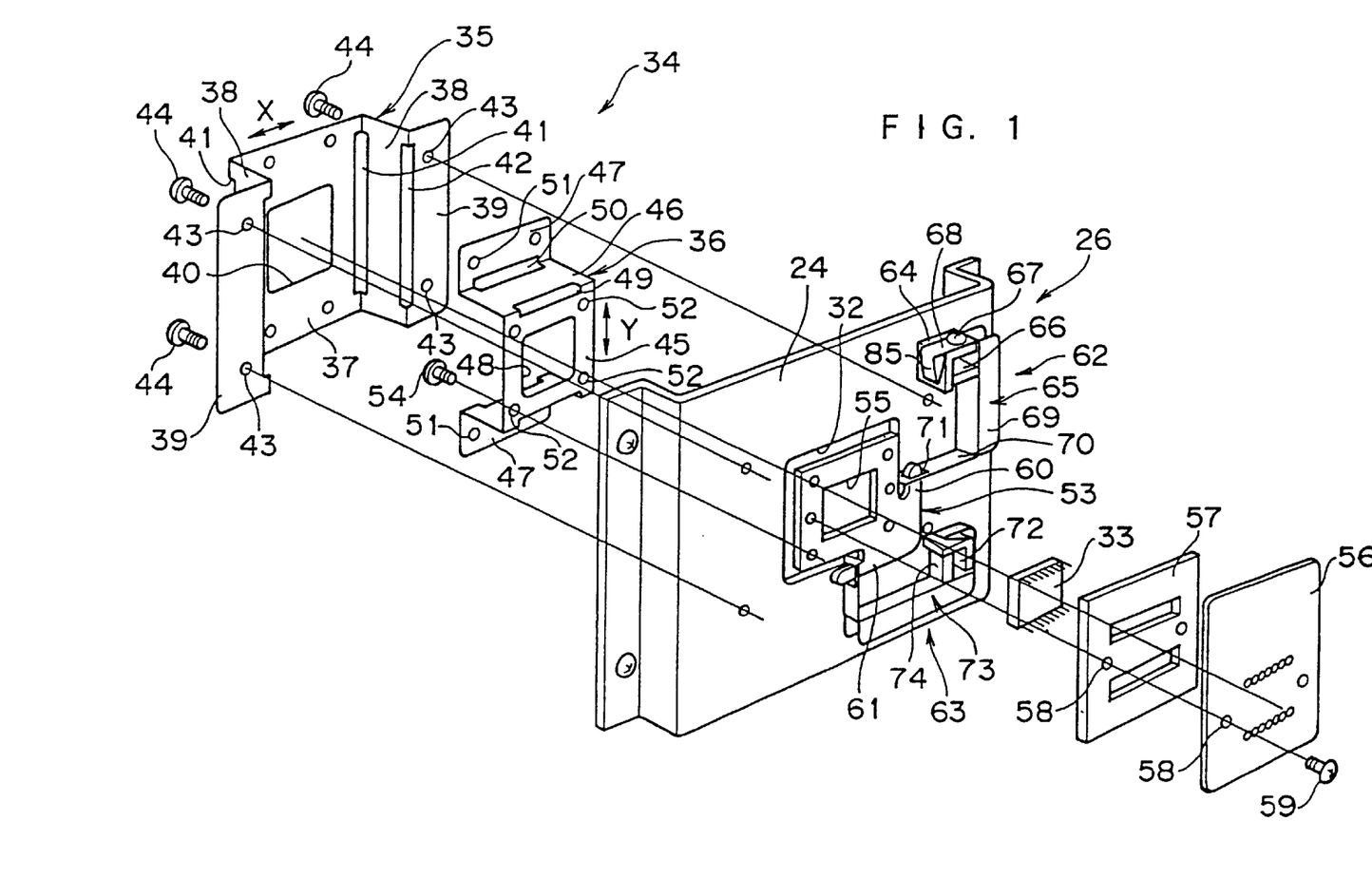
FIG. 1 is an exploded perspective view of a principal part of an image sensing camera according to the present invention.

An example of an image sensing apparatus of the present invention will be explained below. FIG. 1 is an exploded perspective view of the principal part of an image sensing camera according to the present invention, and FIG. 2 is a partially cutaway perspective view of the image sensing camera according to the present invention to show its internal structure.

Figure 2:
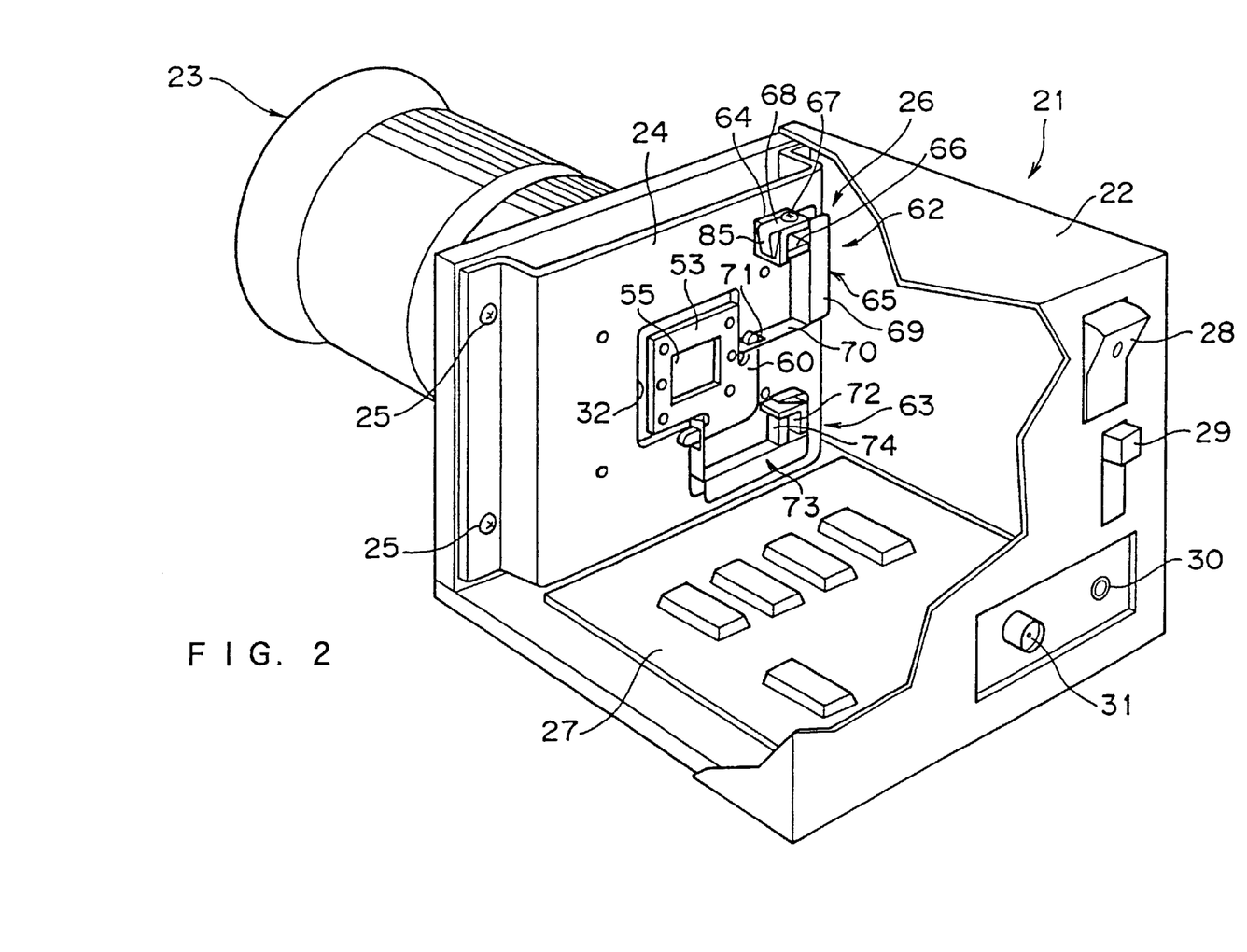
FIG. 2 is a partially cutaway perspective view of the image sensing camera according to the present invention and shows its internal structure.

As shown in FIG. 2, this image sensing camera 21 has a lens system 23 on a front surface portion of a housing 22, and a base plate 24 that supports a CCD (not shown in FIG. 2) at the focal point position of the lens system 23 is arranged in the housing 22. The base plate 24 is fixed to the housing 22 by screws 25, and the CCD is mounted on the plate 24 via a CCD driving device 26 as a driving means for changing the irradiation position of incident light.

Furthermore, a main circuit board 27 is fixed in the housing 22, and performs predetermined control. A power switch 28, mode selection switch 29, external power supply jack 30, signal input/output terminal 31, and the like, which are operated by the camera operator, are arranged on the rear surface of the housing 22 as in a normal image sensing camera.

As shown in FIG. 1, a rectangular window portion 32 is opened in the central portion of the base plate 24, and is aligned and fixed so that incident light coming from the lens system 23 passes through the window portion 32. Also, a CCD 33 is arranged to face the window portion 32 so as to receive incident light. The CCD 33 is supported by an X-Y support device 34. The X-Y support device 34 has X- and Y-axis plate members 35 and 36 which respectively serve as first and second plate members.

The X-axis plate member 35 has a support plate portion 37 having a surface perpendicular to the optical axis of incident light, upright portions 38 formed at right angles on both sides of the support member 37, and attachment plate portions 39 formed at the end portions of the two upright portions 38 and extending parallel to the support plate portion 37, and is integrally formed by bending a metal thin plate of, for example, stainless steel or the like, having elasticity. A rectangular window portion 40 through which incident light coming from the lens system 23 passes is opened in the center of the support member 37. Slits 41 and 42 are respectively formed at bent portions as boundaries between the support plate portion 37 and the upright portions 38, and at bent portions as boundaries between the upright portions 38 and the attachment plate portions 39. Two screw attachment holes 43 are opened in each of the attachment plate portions 39 on both sides, and the X-axis plate member 35 is fixed to the base plate 24 by screws 44 using these screw attachment holes 43.

Note that a means for reducing rigidity in bending at each bent portion may comprise a plurality of small holes successively formed at the bent portion in the plate of the above-mentioned slit.

In the state wherein the attachment plate portions 39 are fixed to the base plate 24, the support plate portion 37 is separated by a predetermined distance from the base plate 24 and extends parallel thereto. Since the slits 41 and 42 are formed at the bent portions, the rigidity in bending at the bent portions is reduced. Upon bending at the bent portions, the support member 37 can be elastically displaced in the X-axis direction (horizontal direction in FIG. 1) as a first direction while maintaining a nearly parallel state with respect to the base plate 24.

Figure 3:
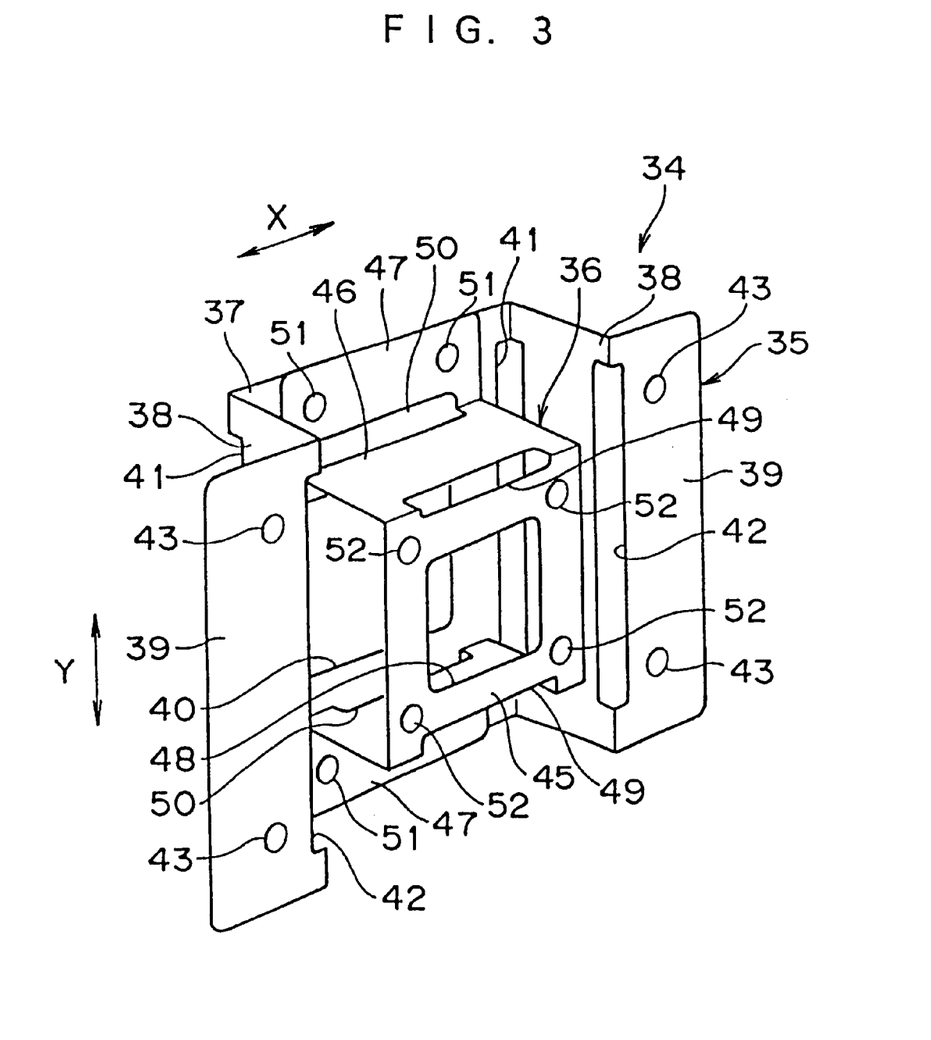
FIG. 3 is a perspective view of an X-Y support device that shows a state wherein X- and Y-axis plate members according to the present invention are combined.

Likewise, the Y-axis plate member 36 of the X-Y support device 34 has a support plate portion 45, upright portions 46, attachment plate portions 47, window portion 358, and slits 49 and 50, has a similar shape smaller than the X-axis plate member 35, and is formed by bending a thin plate. As shown in FIG. 3, which illustrates the state wherein the X- and Y-axis plate members 35 and 36 are combined, the Y-axis plate member 36 is fixed to the support plate portion 37 of the X-axis plate member 35 using screw attachment holes 51 to be fitted into the U-shaped section of the member 35.

In the state wherein the attachment plate portions 47 are fixed to the X-axis plate member 35, the support plate portion 45 of the Y-axis plate member 36 is separated by a predetermined distance from the support plate portion 37 of the X-axis plate member 35, and extends parallel thereto. Upon bending at the bent portions, the support plate portion 45 of the Y-axis plate member 36 can be elastically displaced in the Y-axis direction (the vertical direction in FIG. 1) as a second direction that makes a right angle with the X-axis while maintaining a nearly parallel state with respect to the support plate portion 37 of the X-axis plate member 35. Hence, by synthesizing the movements of the two support plate portions 37 and 45, the support plate portion 45 of the Y-axis plate member 36 can move within the X-Y plane (in a plane perpendicular to incident light) with respect to the base plate 24.

Since the X-Y support device 34 is built by the X- and Y-axis plate members 35 and 36, a support device that operates accurately with a simple arrangement can be obtained.

Screw attachment holes 52 are opened in the four corners of the support plate portion 45 of the Y-axis plate member 36, and an X-Y moving plate 53 is fixed to the support plate portion 45 by screws 54 using these screw attachment holes 52. A window portion 55 is opened in the center of the X-Y moving plate 53, and the CCD 33 is fixed there. The CCD 33 is attached to a circuit board 56 via a CCD aligning plate 57, and is fixed to the X-Y moving plate 53 by screws 59 using screw attachment holes 58 formed in the circuit board 56 and the CCD aligning plate 57.

Note that the CCD 33 as the solid-state image sensing device has an image sensing surface made up of a large number of photoelectric conversion elements in a matrix in the above-mentioned X- and Y-axis directions, and the color filter 11 shown in FIG. 4 is fixed to the image sensing surface. In the state wherein the CCD 33 is fixed to the X-Y moving plate 53, the position of the CCD is adjusted by the CCD aligning plate 57 so that the X-Y directions of the image sensing surface agree with those of the X-Y support device 34, and the image sensing surface of the CCD 33 is located at a predetermined position with respect to incident light.

X- and Y-axis engaging arms 60 and 61 are respectively formed on the side and lower portions of the X-Y moving plate 53. X- and Y-axis driving portions 62 and 63 are formed on the base plate 24 in correspondence with these arms. The X-axis driving portion 62 has a support member 64 fixed to the base plate 24, a displacement amplification angle 65 made up of a spring member, and an X-axis piezoelectric element 66 which is displaced in the X-axis direction.

The displacement amplification angle 65 has a fulcrum portion 68 fixed to the support member 64 by a screw 67, an intermediate arm portion 69, and an engaging portion 70 formed at the distal end of the intermediate arm portion 69. The X-axis engaging arm 60 of the X-Y moving plate 53 fits into a hole 71 opened in the distal end of the engaging portion 70, thus determining its position.

The X-axis piezoelectric element 66 is attached while being clamped between the support member 64 and the intermediate arm portion 69 under pressure. A leaf spring 85 is formed at the distal end of the fulcrum portion 68 of the displacement amplification angle 65, and upon attachment of the X-axis piezoelectric element 66, the leaf spring 85 presses the intermediate arm portion 69 against the X-axis piezoelectric element 66.

The X-axis piezoelectric element 66 is connected to a driver circuit device (not shown), and is displaced upon application of a voltage at a predetermined timing. When the X-axis piezoelectric element 66 is displaced, its movement is amplified by the displacement amplification angle 65 and is transmitted to the X-axis engaging arm 60, thereby moving the X-Y moving plate 53, i.e. the CCD 33, in the X-axis direction. By changing the applied voltage, the moving amount of the CCD 33 can be adjusted. These control operations can be attained using a known means.

The Y-axis driving portion 63 has an arrangement similar to that of the X-axis driving portion 62, and has a support member 72, a displacement amplification angle 73, and a Y-axis piezoelectric element 74 which is displaced in the Y-axis direction. When a voltage is applied to the Y-axis piezoelectric element 74 at a predetermined timing, the X-Y plate 53, i.e. the CCD 33, can be moved in the Y-axis direction.

Note that the CCD 33 must be moved in units of arrangement intervals of the photoelectric conversion elements upon driving the piezoelectric elements 66 and 74. In this case, calibration between the voltages (driving voltages) to be applied to the piezoelectric elements 66 and 74 and the moving distances of the CCD 33 can be easily attained using moiréfringes appearing on a television monitor upon sensing an image of, for example, a test pattern.

For example, a black vertical stripe pattern and horizontal stripe pattern are drawn on a resolution chart to measure the resolution, and the thicknesses and intervals of the individual stripes are gradually narrowed. Upon focusing on this chart, since false colors as the above-mentioned defect of the single-plate type are produced at the boundary portions between black and white, another stripe pattern as an alternate pattern of red and blue appears at the overlapping position with the stripe patterns. The false color stripe pattern is easy to see since it has a larger thickness and intervals than those of the stripes of the test patterns, and the moving amount upon moving the CCD can be easily confirmed since it is similarly larger.

Upon performing adjustment in the X-direction, the driving voltage is adjusted while observing the false color position appearing on the vertical stripe pattern. Strictly speaking, the false color position is not a position with respect to the monitor but a relative position with respect to the vertical stripe pattern is observed. If red and blue replace each other before and after movement, the moving amount just equals one pixel. Adjustment in the Y-direction can be similarly attained using the horizontal stripe pattern.

Note that the test chart used in such adjustment is not limited to the resolution chart, but any other patterns may be used as long as false colors which are properly easy to see appear.

Figure 5:
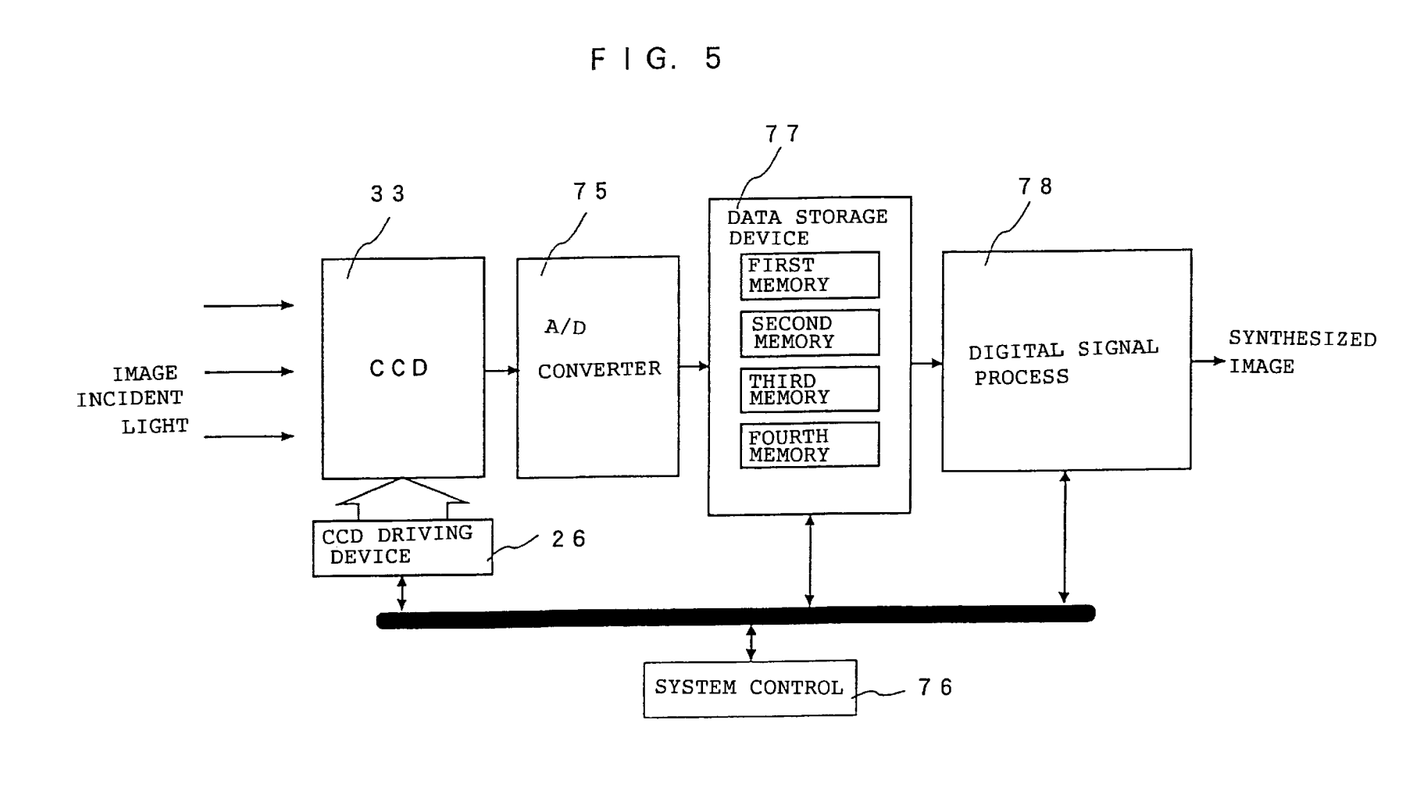
FIG. 5 is a block diagram showing the overall apparatus corresponding to an image sensing apparatus according to the present invention.
Figure 6:
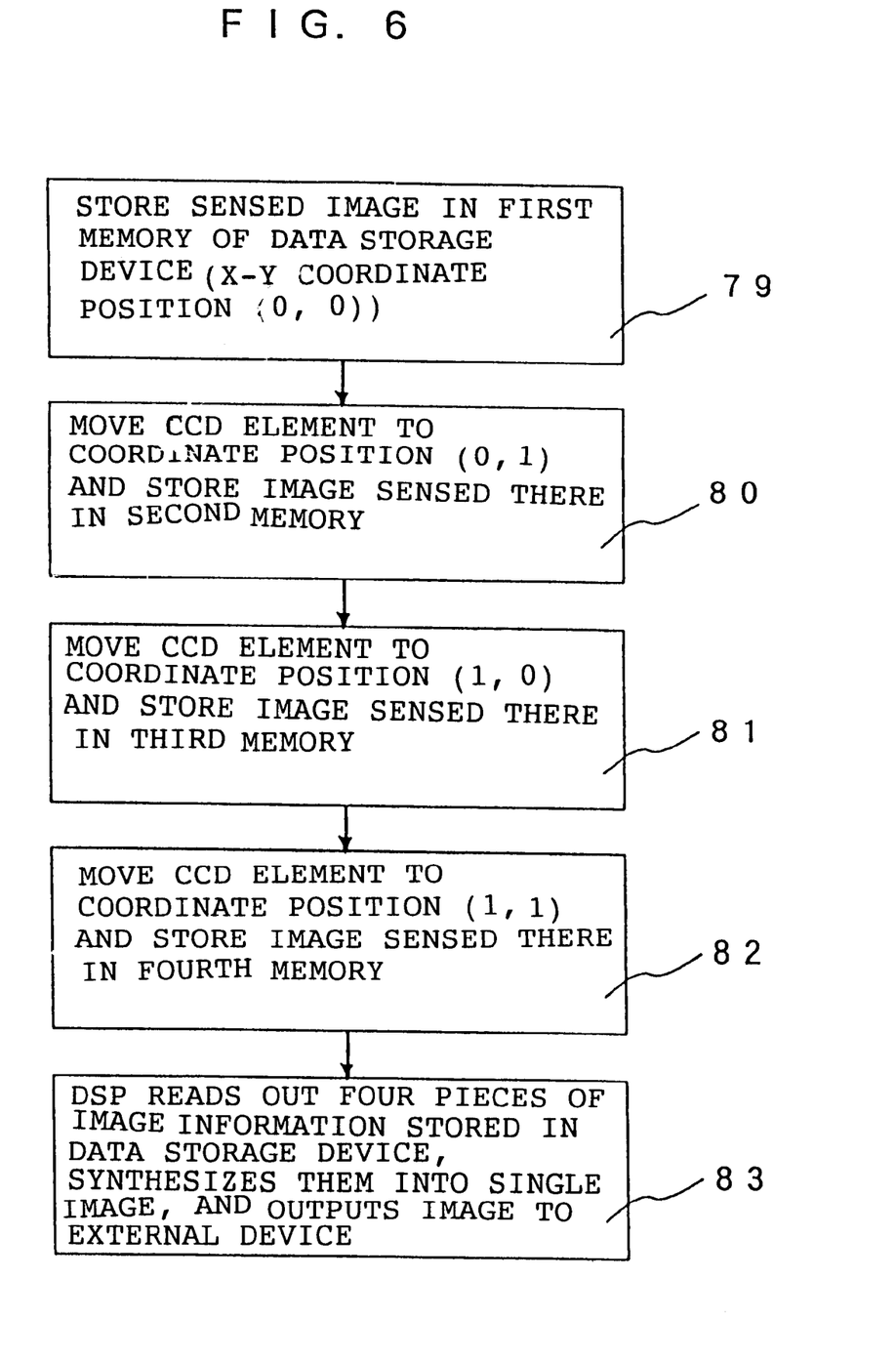
FIG. 6 is a control flow chart of the apparatus shown in FIG. 5.

FIG. 5 is a block diagram showing the overall apparatus corresponding to the above-mentioned image sensing apparatus, and FIG. 6 is a control flow chart of the apparatus. As shown in FIG. 5, the CCD 33 photoelectrically converts image incident light and outputs signals to an A/D converter 75. The A/D converter 75 quantizes the signals the CCD 33 as image data, which are sequentially stored in a data storage device 77 as a storage means under the control of a system control 76. A digital signal process (DSP) 78 as a processing means reads out the image data stored in the storage device 77, synthesizes them into a single image, and outputs the image. On the other hand, the CCD driving device 26 appropriately moves the CCD 33 in units of arrangement intervals of the pixels in accordance with commands from the system control 76.

Movement and image sensing of the CCD 33 are done, as shown in, for example, FIG. 6. More specifically, in step 79, image data sensed at an X-Y coordinate position (0, 0) is stored in a first memory of the data storage device 77. In step 80, image data sensed at an X-Y coordinate position (0, 1) is stored in a second memory of the data storage device 77. In step 81, image data sensed at an X-Y coordinate position (1, 0) is stored in a third memory of the data storage device 77. In step 82, image data sensed at an X-Y coordinate position (1, 1) is stored in a fourth memory of the data storage device 77. Finally, in step 83, the DSP 78 reads out image data from the first to fourth memories, synthesizes them into a single image, and outputs the image.

In this manner, by synthesizing image data sensed at a plurality of positions, a color still image with a high resolution can be obtained even by a relatively small number of pixels of the solid-state image sensing device. In the case of this example, since image data of the three primary colors are obtained for all the pixels, a resolution three times that of a conventional solid-state image sensing device having a color filter can be achieved.

As a conventional scheme for increasing the resolution of a solid-state image sensing device, a pixel shift method is known. The resolution of a solid-state image sensing device such as a CCD or the like is determined by the number of pixels, and in order to increase the resolution of the solid-state image sensing device itself, pixels must be arranged at high density. For this reason, the increase in resolution by improving the element itself is limited. In view of this problem, the pixel shift method is proposed as a conventional technique for increasing the resolution of a solid-state image sensing device with a limited number of pixels. In this method, image sensing is done not only at an original position of the solid-state image sensing device but also at a position obtained by shifting the relative position between the solid-state image sensing device and incident light by, for example, ½ the pixel pitch (the arrangement interval of photoelectric conversion element) to extract information also from a space where no pixel is present in practice, and that information is inserted into an original image, thereby improving the resolution. If the number of sampling points is increased by setting the shift amount to be ⅓, ¼, . . . , of the pixel pitch, finer space information can be obtained although it also depends on the relationship with the photosensitive range per pixel of the element.

Figure 7:
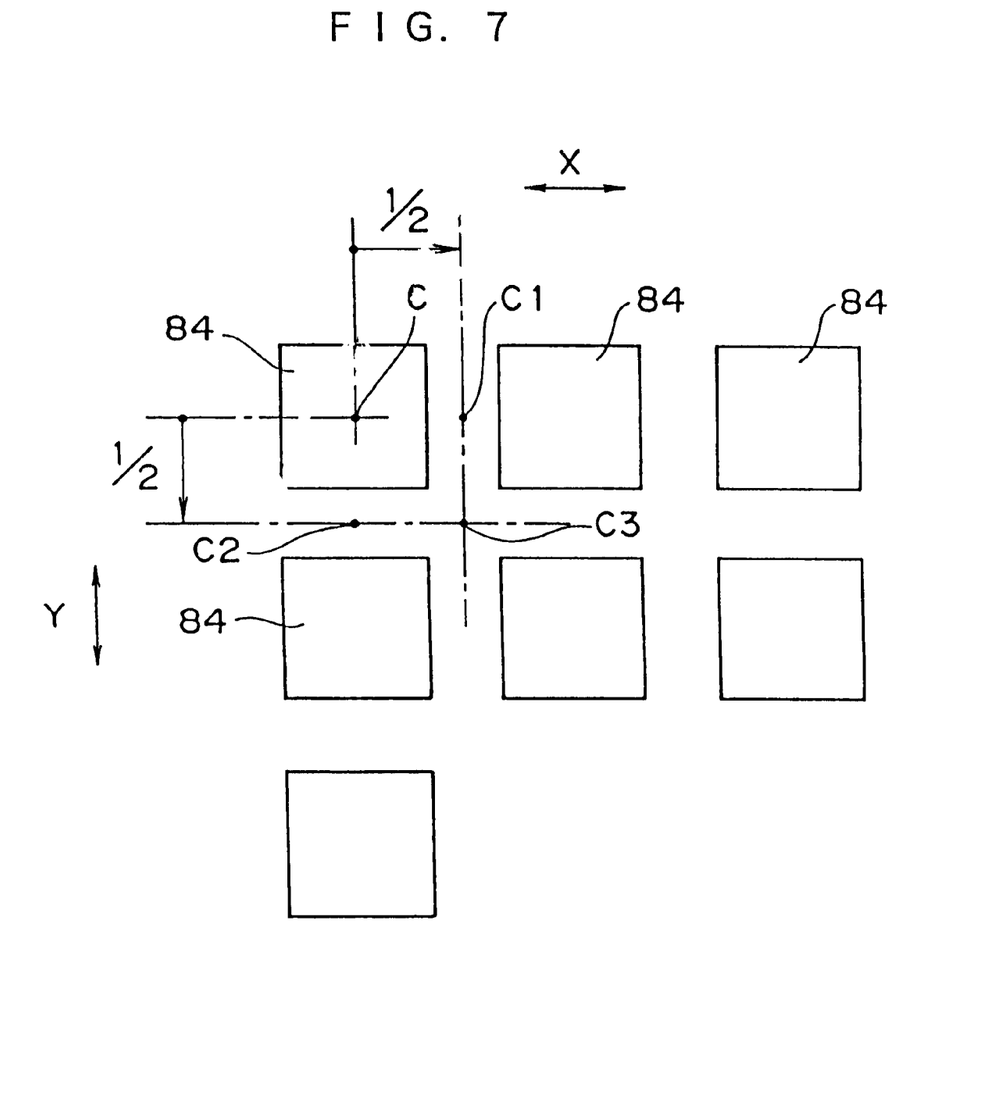
FIG. 7 is an explanatory view of a technique that applies a pixel shift method to the present invention.

When this pixel shift method is applied to the present invention, an image with higher resolution can be obtained. FIG. 7 is an explanatory view of an example that applies the pixel shift method to the present invention.

In FIG. 7, squares represent pixels 84 of a solid-state image sensing device. Let C be the central point of a certain pixel 84 located at the upper left corner, C1 be the point moved from the point C by ½ the pixel pitch in the X-direction, C2 be the point moved from the point C by ½ the pixel pitch in the Y-direction, and C3 be the point moved from the point C by ½ the pixel pitch in both the X- and Y-directions.

In image sensing according to the present invention that adopts pixel shift, when the center of the certain pixel 84 at the upper left corner is located at the point C, the solid-state image sensing device is moved, as described above, in units of pixel pitches to have the point C as the center, and image sensing is at the four positions. Subsequently, the solid-state image sensing device is moved by half a pixel, so that the center of the certain pixel 84 at the upper left corner comes to the point C1, and the solid-state image sensing device is similarly moved in units of pixel pitches to have that position as the center, as described above, so as to execute image sensing at the four positions. Similarly, the solid-state image sensing device is moved, so that the center comes to the points C2 and C3, and the solid-state image sensing device is also moved in units of pixel pitches to have these positions as the centers, so as to execute image sensing at the four positions. Finally, a total of 16 image data sensed as described above are synthesized to obtain a single color still image.

Note that 16 image sensing operations are performed to obtain a single still image in this example. However, the activation time of the piezoelectric element required for moving the solid-state image sensing device by a very small amount is very short, and 16 image sensing operations can be completed within a very short period of time.

By using the pixel shift method, high resolution can be attained. In the example described above with reference to FIG. 7, a resolution equivalent to that obtained using three devices each having one million pixels can be obtained using a single solid-state image sensing device having 250 thousand pixels.

The high-resolution still image camera of the present invention has as its first objective to obtain a high-resolution still image, but may be required to be used as a normal CCD camera at video signal level. In this case, false colors (moiré) are considered as a drawback and pose a problem.

Normally, since a mosaic color CCD camera cannot accurately detect color tones in units of dots, false colors (moiré) are produced near high-frequency components included in an image. In order to prevent this, the image must be blurred to some extent before the CCD, i.e. high-frequency components must be cut, and an optical low-pass filter is normally used for that purpose. However, since such filter cannot completely remove moiré, a moiré removal circuit as a combination of an edge detection circuit and a color signal suppression circuit is used.

Since the high-resolution still image camera of the present invention has as its first objective to obtain a high-resolution image, the high-frequency components of an image are important, and an optical low-pass filter cannot be used. Accordingly, when the high-resolution still image camera of the present invention operates in a normal resolution mode, the above-mentioned problem of false colors occurs. As one solution to this problem, in the normal resolution mode, an X-Y fine movement table is vibrated at least at one cycle within one exposure time (e.g. 1/60 sec) to cut high-frequency components without using any optical low-pass filter, thereby solving the problem of false colors. However, in this method, if moiré is to be completely removed, the image is excessively blurred; if the effect is suppressed to that as low as the optical low-pass filter, it is hard to control vibrations, and a moiré removal circuit is required as in the conventional apparatus.

According to the present invention, in order to solve this problem, in the normal resolution mode, an X-Y fine movement table is moved in units of fields so that the phase of moiré is reversed between the first and second fields, thereby preventing moiré from being visually observed. The moving direction of the table depends on the arrangement order of colors on the color filter used. In the case of the color filter (R, G, B, G) in the above embodiment, it is appropriate to simultaneously move the table by one pixel in both the X- and Y-directions, thus consequently moving the table obliquely. That is, as described above, when the table is shifted by one pixel in the X-direction, the red and blue components of moiré fringes appearing on the fine vertical stripe pattern replace each other, and when the table is further shifted by one pixel in the Y-direction, the red and blue components of moiré fringes appearing on the fine horizontal stripe pattern replace each other. If such operations are repeated in units of fields, the eyes of a human being can no longer perceive moiré although red and blue components are in fact alternately displayed. At this time, when the CCD read timing is also shifted by one pixel in units of fields, a high-resolution image signal can be obtained.

As described above, the high-resolution still image camera of the present invention can obtain a video signal which is completely free from moiré and has higher image quality than the conventional apparatus without using any optical low-pass filter or moiré removal circuit.

In the above-description, in order to move the irradiation position of incident light on the solid-state image sensing device, the solid-state image sensing device is moved. However, it is necessary to displace the solid-state image sensing device and incident light relative to each other in the present invention, and incident light may be moved in place of the solid-state image sensing device. Such movement can be attained using, for example, a glass plate or the like.

More specifically, a transparent material such as a glass plate or the like having a refractive index larger than that of air is supported to be independently and slightly pivotal about the X- and Y-axes, and is set in front of the CCD on the optical path, and by changing the tilt angle of the transparent material, incident light is diffracted to change the irradiation position. In this case, in order to largely deflect incident light by a small tilt angle, the thickness of the transparent material can be increased.

In the above-mentioned example, the color filter on which R, G, and B components are arranged in a mosaic pattern is used. However, the color filter used in the present invention is not limited to such specific filter. Various other combinations of R, G, and B filters arranged in a mosaic pattern are also available, and the present invention can be applied to various types of color filter arrays (CFAs) such as complementary colors Cy, M, and Ye, those including white W, and the like.

Furthermore, the present invention can suitably use a color filter on which R, G, and B components are arranged in turn in a stripe pattern. In the case of the above-mentioned mosaic pattern, the irradiation position of incident light must be moved in both the X- and Y-directions. However, when the stripe pattern is used, the irradiation position need only be moved in one direction to cross the stripe, thus simplifying the structure of the driving device.

In the above description, the CCD has been exemplified as the solid-state image sensing device. However, the present invention is not limited to this. For example, the present invention can be similarly applied to other devices such as a MOS type image sensing device, a CPD (Charge Priming Devicen or priming transfer device), and the like.

In the above-mentioned example, the piezoelectric elements are used as a driving source. Also, magnetostrictive elements may be preferably used, and a linear motor such as a plunger solenoid, a rotary motor, and a simple electromagnet may also be used.

In the above description, the image sensing surface has been exemplified as a plane. However, the image sensing surface made up of photoelectric conversion elements need not always be a plane. In some cases, the image sensing surface may be formed into a spherical surface, and relative movements may be made within the spherical surface.

As described above, according to the present invention, a solid-state image sensing device, which has an image sensing surface made up of a large number of photoelectric conversion elements arranged in a matrix and to the front surface of the image sensing surface of which a color filter having different color component regions in correspondence with the arrangement intervals of photoelectric conversion elements is fixed, is used, the irradiation region of incident light with respect to the solid-state image sensing device is changed in units of arrangement intervals of the photoelectric conversion elements, and image data of the solid-state image sensing device sensed at a plurality of changed positions are image-synthesized to obtain a single color still image. For this reason, image quality as high as that of the three-plate type can be obtained with cost as low as that of the single-plate type without increasing the number of solid-state image sensing devices or the number of pixels, and the input time can be prevented from becoming redundant. Furthermore, a moving image free from any moiré can also be generated.

The present invention can assure a broad industrial application range, i.e. can be applied not only to recording of still images but also to recognition, discrimination, and the like of recorded images.

What is claimed is:

1. A color still image sensing apparatus comprising:

a solid-state image sensing device having an image sensing surface made up of a large number of photoelectric conversion elements arranged in a matrix with rows of photoelectric conversion elements in a horizontal direction and columns of photoelectric conversion elements in a vertical direction;

a color filter fixed to a front surface of the image sensing surface of said solid-state image sensing device and having different color component regions in correspondence with arrangement intervals of the photoelectric conversion elements to form a matrix with rows of color component regions in the horizontal direction and columns of color component regions in the vertical direction;

driving means for displacing said solid-state image sensing device and an incident light with respect to said solid-state image sensing device relative to each other along the image sensing surface in units of arrangement intervals of the photoelectric conversion elements so as to change an irradiation position of the incident light with respect to said solid-state image sensing device, the driving means displacing the solid-state image sensing device and the incident light intermittently at a distance of one pixel, a half pixel, or a combination thereof;

storage means for recording image data of said solid-state image sensing device sensed at a plurality of positions corresponding to the irradiation positions changed by said driving means; and processing means for reading out the image data stored in said storage means and synthesizing the readout image data into a still image having pixels that each include components of all color information contained therein, wherein said driving means displaces said solid-state image sensing device and the incident light a plurality of number of times, so that an irradiation region of the incident light having a size corresponding to a size of the photoelectric conversion element moves to all types of adjacent color component regions of said color filter of said solid-state image sensing device, wherein the driving means is configured to displace the solid-state image sensing device and incident light with respect to the solid-state image sensing device relative to each other along the image sensing surface either in the horizontal direction across a row or in the vertical direction across a column, wherein the driving means is configured to displace the solid state image sensing device and the incident light with respect to the solid state image sensing device relative to each other in relation of the color component regions of the color filter until three different color components are extracted.

2. A color still image sensing apparatus according to claim 1, wherein the color component regions of said color filter are arranged in a mosaic pattern to have a size corresponding to a size of the photoelectric conversion element.

3. A color still image sensing apparatus according to claim 1, wherein the color component regions of said color filters are arranged in a stripe pattern to have a width corresponding to a width of the photoelectric conversion element.

4. A color still image sensing apparatus according to claim 1, wherein said driving means moves said solid-state image sensing device relative to the incident light.

5. A color still image sensing apparatus according to claim 1, wherein said driving means displaces said solid-state image sensing device and the incident light relative to each other by ½ of the arrangement interval of the photoelectric conversion element, and displaces said solid-state image sensing device and the incident light relative to each other therefrom in units of arrangement intervals of the photoelectric conversion elements so as to change the irradiation position of the incident light with respect to said solid-state image sensing device.

6. A color still image sensing apparatus according to claim 16, wherein said processing means has a video signal generation function of outputting a moving image in addition to synthesis of a still image, and the video signal generation function receives two different images sensed by displacing said solid-state image sensing device and the incident light in one or both of horizontal and vertical directions in units of arrangement intervals of said solid-state image sensing device, outputting a first image at a timing of a first field, and outputting a second image at a timing of a second field.

7. A color still image sensing apparatus according to claim 6, wherein the first and second images have a relationship therebetween in which phases of moiré fringes appearing therein are opposite to each other.

8. A color still image sensing apparatus according to claim 1, wherein the color filter has three color component regions of red, green, and blue.

9. A color still image sensing apparatus according to claim 12, wherein the color filter has only three color component regions of red, green, and blue.

10. A color still image sensing apparatus according to claim 13, wherein the color component regions in the color filter are arranged so that rows including alternating green and red components and rows including alternating blue and green components are alternately arranged so that green components form a checkerboard pattern.

11. A color still image sensing apparatus according to claim 1, wherein the driving means is configured to displace the solid state image sensing device and the incident light with respect to the solid state image sensing device relative to each other to extract color components of four adjacent color component regions of the color filter arranged in a square pattern.

* * * * *